United States Patent
Leeks

(10) Patent No.: US 11,239,699 B2
(45) Date of Patent: Feb. 1, 2022

(54) INDUCTIVE POWER TRANSFER SYSTEM

(71) Applicant: MBDA UK LIMITED, Stevenage (GB)

(72) Inventor: Howard Mallory Leeks, Bolton (GB)

(73) Assignee: MBDA UK Limited, Stevenage (GB)

( * ) Notice: Subject to any disclaimer, the term of this patent is extended or adjusted under 35 U.S.C. 154(b) by 0 days.

(21) Appl. No.: 16/500,899

(22) PCT Filed: Mar. 29, 2018

(86) PCT No.: PCT/GB2018/050864
§ 371 (c)(1),
(2) Date: Oct. 4, 2019

(87) PCT Pub. No.: WO2018/185471
PCT Pub. Date: Oct. 11, 2018

(65) Prior Publication Data
US 2020/0136434 A1 Apr. 30, 2020

(30) Foreign Application Priority Data

Apr. 5, 2017 (EP) ..................................... 17164890
Apr. 5, 2017 (GB) ..................................... 1705452

(51) Int. Cl.
*H02J 50/12* (2016.01)
*H02J 50/80* (2016.01)
*H02J 7/00* (2006.01)

(52) U.S. Cl.
CPC .............. *H02J 50/12* (2016.02); *H02J 50/80* (2016.02); *H02J 7/00034* (2020.01)

(58) Field of Classification Search
CPC .. H02J 50/80; H02J 50/10; H02J 50/12; H02J 7/025; H02J 5/005; H02J 7/00034
See application file for complete search history.

(56) References Cited

U.S. PATENT DOCUMENTS 9,166,440 B2 * 10/2015 Ben-Shalom ........... H01F 38/14
2011/0049997 A1 * 3/2011 Urano ..................... H02J 5/005
307/104

(Continued)

FOREIGN PATENT DOCUMENTS

EP 2389730 A1 11/2011
EP 2608352 A1 6/2013

(Continued)

OTHER PUBLICATIONS

International Preliminary Report on Patentability dated Oct. 8, 2019, together with the Written Opinion received in related International Application No. PCT/GB2018/050864.

(Continued)

*Primary Examiner* — Ryan Johnson
(74) *Attorney, Agent, or Firm* — Scully, Scott, Murphy & Presser, PC

(57) ABSTRACT

An inductive power transfer system (1) for coupling a power source to a load across an air gap (11) is disclosed. The system (1) comprises a primary unit (3) associated with a host platform and a secondary unit (5) arranged to receive power transmitted inductively from the primary unit (3). The primary unit (3) includes a phase detection circuit (21) configured to detect phase changes in a signal in the primary unit (3) indicative of changes in an operating condition within the secondary unit (5), and a drive circuit (17). The drive circuit (17) is configured to adjust the power level transmitted to the secondary unit (5) depending on the detected phase.

10 Claims, 14 Drawing Sheets

(56) References Cited

U.S. PATENT DOCUMENTS

| | | | |
|---|---|---|---|
| 2013/0154386 A1* | 6/2013 | Bae .................. | H02J 5/005 307/104 |
| 2016/0043562 A1 | 2/2016 | Lisi et al. | |
| 2016/0336804 A1 | 11/2016 | Son et al. | |

FOREIGN PATENT DOCUMENTS

| | | |
|---|---|---|
| EP | 2637317 A2 | 9/2013 |
| EP | 2800239 A1 | 11/2014 |
| EP | 3145047 A1 | 3/2017 |
| WO | 2010/085703 A1 | 7/2010 |

OTHER PUBLICATIONS

International Search Report dated Sep. 18, 2018 issued in PCT/GB2018050864.
Partial European Search Report dated Sep. 26, 2017 issued in EP 17164890.
GB Search Report dated Sep. 20, 2017 issued in GB 1705452.9.
Texas Instruments, "Qi Compliant Wireless Power Transmitter Manager", Jun. 21, 2016 (Jun. 21, 2016), Retrieved from the Internet:URL:http://www.ti.com/lit/ds/slusal8c/slusal8c.pdf, (retrieved on Nov. 10, 2017).

* cited by examiner

INDUCTIVE POWER TRANSFER SYSTEM

FIELD OF THE INVENTION

The present invention concerns inductive power transfer systems, and in particular regulation of power transfer in such power transfer systems.

BACKGROUND OF THE INVENTION

Many types of spacecraft and missile systems use an umbilical connector extending between a host and a vehicle to be launched. Such an umbilical connection allows the transfer of power and data between the host and the vehicle prior to launch and must be disconnected when the launch vehicle is mechanically separated from the host. Disconnection is typically achieved by a detachable connector assembly or by the use of small explosive devices that are controllably activated to sever the connection at an appropriate time. Timing of the disconnection is critical in such applications and the use of complex connector extraction mechanisms or an explosive charge, however small, in such environments is potentially problematic. This is because forces resulting from the mechanical uncoupling or explosion may adversely affect the planned trajectory of the newly launched vehicle or may cause damage to the vehicle systems.

There are many other applications where conventional energy transmission systems, using cables and connectors, present difficulties or are not feasible. For example, in factory automation systems, it may be desirable to power-up components or sub-assemblies for testing purposes as they pass a particular point in the production line. In addition, it is essential to avoid the use of electrical contacts in tools and other equipment required to operate in explosive atmospheres, extreme working environments or in medical equipment, where the presence of vapours, dust, water or other contaminants may be hazardous. Further applications include within the petro-chemical industry, in the preparation of foodstuffs and applications where a very high degree of isolation is needed between the input power source and the item being powered.

Inductive power transfer has been successfully implemented in transport systems to power a moving object like a trolley, tram, car or train by using the magnetic field generated by a powered track to induce electrical energy into a vehicle-mounted pick-up device. The general structure of an inductive power transfer installation is that there are one or more primary conductors energised with alternating current, and one or more secondary or pickup devices within the moving object which intercept the changing flux surrounding the primary conductor and convert this flux into electrical energy by means of coils.

Inductive power transfer also finds widespread use in many of today's portable devices such as mobile telephones, laptop computers, personal digital assistants, electric shavers and electric toothbrushes. These devices typically incorporate "secondary" power cells which can be recharged via inductive coupling rather than direct electrical connection, saving the user the cost and inconvenience of regularly having to purchase new cells.

However, the regulation of inductive power transfer systems can be problematic. If insufficient power is induced in the secondary (the receptor), the load is starved. If the transferred power is excessive, surplus current circulates within the secondary unit of the system, over-supplying the load and causing damage, or loss of efficiency by energy 'dumping' and the consequential generation of waste heat. Moreover, due to the thermal constraints and response times associated with electronic components of the system, it is not always practical to continuously apply the maximum power levels to the primary coil so as to transfer maximum power. Many inductive power systems employ complex circuitry to control the transfer of the inductive power.

Using feedback for regulation in an inductive power transfer system is known. For example, PCT/GB2007/002973 describes using an infra-red light transmitter in a power transformer to transmit a feedback signal from the secondary (power receiving) module to the primary (power emitting) module. The feedback signal is generated when output voltage to the load exceeds a threshold, and indicates to the primary module that charging should cease. In the absence of a feedback signal, the primary module charges via inductive power transfer. The system thus uses infra-red feedback to switch between charging and non-charging modes, to maintain output voltage at a desired level.

Certain problems are associated with the use of infra-red light components, including that the signal can be blocked by foreign material so, for example, the weather (e.g. rain, dust, pollen) can impact the received signal quality, and contamination by dirt or moisture may affect or interfere with correct detection of the feedback signal. Furthermore, an infra-red system may be subject to external interference causing incorrect decoding of the signal state.

The present invention seeks to provide an improved feedback mechanism for an inductive power transfer system and/or to mitigate one or more of the above-mentioned problems.

SUMMARY OF THE INVENTION

The present invention provides, in a first aspect, an inductive power transfer system for coupling a power source to a load across an air gap. The system comprises a primary unit associated with a host platform and a secondary unit arranged to receive power transmitted inductively from the primary unit. The primary unit includes a phase detection circuit configured to detect phase changes in a signal in the primary unit indicative of changes in an operating condition within the secondary unit, and a drive circuit, configured to adjust the power level transmitted to the secondary unit depending on the detected phase.

Such a system provides an improved power transfer system compared to the systems of the prior art and in particular over a system utilising an infra-red feedback mechanism. The present system feeds back from the secondary to the primary unit using circuitry which is advantageously small and inexpensive compared to infra-red emitter and receiver components. Furthermore, the present system is likely to produce a faster and more accurate response, not requiring infra-red transmission across the air gap, thus minimising errors arising from fluctuations in air pressure and temperature. The system of the present invention advantageously does not need more than one interface between the primary and secondary units, the interface used for both power transfer and feedback. In a further advantage over the prior art, the present system may allow for some adjustment of a frequency of the source (i.e. drive) signal to help maintain efficiency as the air gap, temperature or other variables alter during operation.

The secondary unit may be separable from the primary unit. For example the system may be suitable for use in a missile assembly wherein the assembly comprises a missile received in a host platform. In such a system the primary unit may be located on the host platform and the secondary unit may be located on the missile.

The secondary unit may include control circuitry and the operating condition may be impedance of the input signal to the control circuitry. The impedance of the input signal may vary between a first, lower, input impedance and a second, higher, input impedance.

The drive circuit may operate in each of a charging mode and a stand-by mode, and the drive circuit may be configured to switch between charging mode and stand-by mode in response to the detection by the phase detection circuit of the phase changes.

The phase detection circuit may be configured to provide an ON/OFF shut-down signal to the drive circuit, and the drive circuit may be configured to operate in charging mode when the shut-down signal is OFF and stand-by mode when the shut-down signal is ON.

The phase changes in a signal in the primary unit indicative of changes in an operating condition within the secondary unit may be larger than those phase changes caused by changes in background conditions, for example input power supply, air temperature or pressure or other conditions. The phase changes may be step-changes in signal phase.

The primary unit may comprise resonant circuitry and the phase changes detected by the phase detection circuit may be phase changes in a resonant signal of the resonant circuitry. The resonant circuitry may be part of the primary drive circuit.

The phase detection circuit may be configured to detect the phase changes by measuring the difference between the resonant signal phase and the phase of a source signal.

The phase detection circuit may be configured to generate a direct current voltage proportional to the difference.

The phase detection circuit may be arranged to compare the direct current voltage to a reference voltage, and to send the shut-down signal to the drive circuit when the direct current voltage exceeds the reference voltage.

The phase detection circuit may include an inductor coil and a series resonant capacitor. The phase detection circuit may be configured to measure resonant signal phase by detecting the phase of a voltage waveform on the junction of said series resonant capacitor and inductor coil. The phase detection circuit may include two resonant capacitors connected in parallel to one another, and connected in series with the inductor.

The drive circuit may be arranged to measure the difference between resonant signal phase and the phase of a source signal, and to produce a direct current voltage proportional to the difference in phase, and to use the direct current voltage to alter the frequency of the source signal.

The phase detection circuit may be configured such that the resonant signal phase changes in response to the varying of input impedance. The phase detection circuit may be configured such that the resonant signal phase changes in response to the varying of input impedance between the first, lower, input impedance and the second, higher, input impedance.

The secondary unit may apply an output voltage to the load. The output voltage may be proportional to the induced power. The secondary unit may comprise a control circuit configured to detect when the output voltage exceeds a predetermined value and, in response, to vary the input impedance. The secondary unit may be configured such that when the output voltage exceeds the predetermined value, the control circuit varies the input impedance. The secondary unit may be configured such that when the output voltage exceeds the predetermined value, the control circuit varies the input impedance from the first, lower, input impedance to the second, higher, input impedance. The control circuit may comprise a multi-stage comparator circuit. The secondary unit may be configured such that when the output voltage exceeds the predetermined value, a feedback indication is generated, causing the control circuit to vary the input impedance. The secondary unit may be configured such that when the output voltage exceeds the predetermined value, a feedback indication is generated, causing the control circuit to vary the input impedance from the first, lower, input impedance to the second, higher, input impedance.

The control circuit may include a switch for switching between a low impedance path and a high impedance path. The switch may be a transistor arranged in parallel with a resistor, so that the low impedance path is provided by the transistor and the high impedance path is provided by the resistor. The transistor may be a MOSFET transistor. The transistor may have a gate voltage controlled by the multi-stage comparator circuit.

The primary unit may comprise a clock circuit configured to measure the phase difference between the resonant signal phase and a clock signal phase, and to adjust the clock signal to account for the phase difference. The phase differences may be smaller scale than the differences between the resonant signal phase and the source signal phase.

The secondary unit may comprise a power-on-reset circuit configured to set the secondary unit at the first, lower, input impedance at power up. The power-on-reset circuit may additionally or alternatively be configured to set the initial power level of the primary unit to high-power after a short stabilisation period. The short period may have a duration of between 4 to 10 ms, and preferably 6 ms.

Power may be applied to the primary coil by a switching waveform. In charging mode, power may be applied to the primary coil in every switching cycle. In stand-by mode, power may be applied to the primary coil in fewer than every switching cycle.

In a second aspect, the present invention provides an inductive power transfer system for coupling a power source to a load across an air gap, the system comprising a primary unit associated with a host platform and a secondary unit arranged to receive power inductively from the primary unit. The primary unit comprises a primary transformer coil and circuitry configured to apply power by a switching waveform to the primary coil. The secondary unit comprises a secondary transformer coil, wherein the primary unit is arranged to operate in: (i) a charging mode, where, for a given period of switching cycles, power is applied to the primary coil in every switching cycle, and (ii) a stand-by mode, where, for the same given period of switching cycles, power is applied to the primary coil in fewer than every switching cycle.

The primary unit may comprise resonant circuitry and may be configured to detect phase changes in signals in the resonant circuitry indicative of changes in an operating condition within the secondary unit, and to switch between the charging and stand-by modes in response to the detected changes.

The switching waveform may include a dead-band period at the beginning of each switching half-cycle.

In the stand-by mode, in a period of 18 switching cycles, the primary unit may apply power in two consecutive switching cycles and may apply no power for the remaining 16 switching cycles.

In a third aspect, the present invention provides a method of providing feedback in an inductive power transfer system, including the following steps: providing a drive signal in a charging mode to energise a first inductor coil; inducing power in a second inductor coil separated from the first coil across an air gap; monitoring the induced voltage against a threshold value; altering the impedance level in circuitry connected to the second inductor coil when the induced voltage exceeds the threshold value; detecting a phase shift in a resonant signal in circuitry connected to the first coil, the phase shift consequent on the alteration in impedance level; altering the drive signal from the charging mode to a stand-by mode in response to detecting the phase shift.

The charging mode may be a high-power mode. The stand-by mode may be a low-power mode.

DESCRIPTION OF THE DRAWINGS

An embodiment of the present invention will now be described by way of example only with reference to the accompanying schematic drawings of which.

DETAILED DESCRIPTION

High-Level Function

Figure 1:
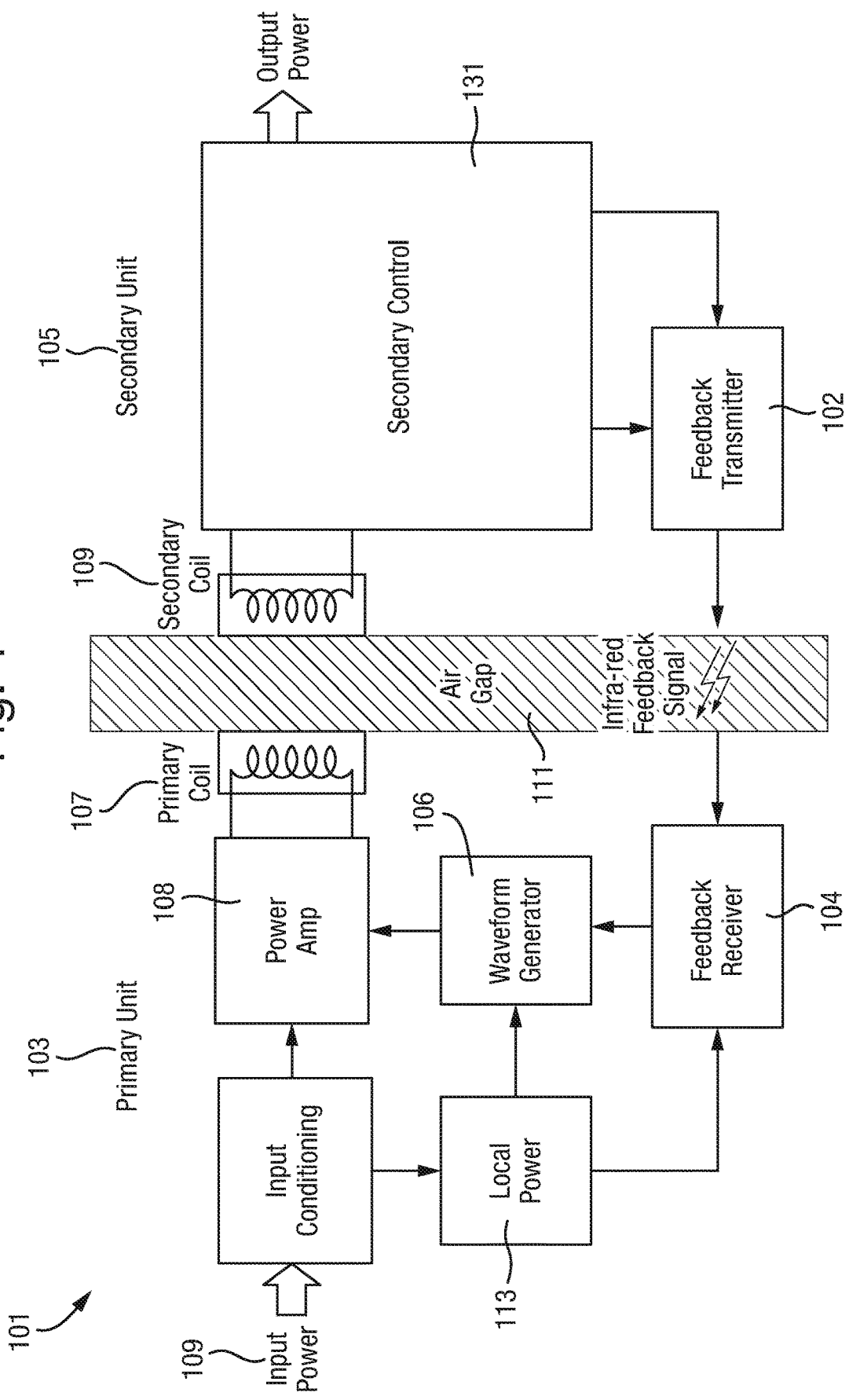
FIG. 1 is a block diagram of an inductive power transfer system of the prior art.

The present invention is an improvement of the inductive power transfer system disclosed in WO2008/017818A1 "the example prior art" (FIG. 1).

The example prior art inductive power transfer system 101 is designed for use in an aircraft environment. It has a primary power transmitting coil 107 and a secondary power receiving coil 109 separated by an air gap 111. The air gap 111 can be varied between 1 mm and 10 mm, depending on the physical size of the power transformer and the quantity of power to be transferred.

The system 101 comprises primary unit components coupled to the primary coil 107 and secondary unit components coupled to the secondary coil 109, with a feedback transmitter 102 and receiver 104 to feed a signal from the secondary unit 105 to the primary unit 103.

The primary unit 103 includes a single phase or 3-phase alternating current, or direct current power input. The primary unit 103 is carried by the host aircraft (not shown) while the secondary unit is separable from the primary unit and is carried by a launchable vehicle (not shown). Local power supply 113 performs a conversion to achieve an output of 12V running at a load current of nominally 20 mA to supply the electronics components in the primary unit 103 of the power transfer system.

A waveform generator 106 provides the central control function of the inductive power transfer system's primary unit 103 operation. It outputs two signals to a power amplifier stage 30 (not shown) to enable the application of power to the transformer in a push-pull format. The push pull format ensures a flux reversal within the magnetic core of the transformer primary each half-cycle, thereby avoiding any tendency for core saturation through 'dc' offsets.

The primary coil 107 of the power transformer is wound with a number of turns to suit the input voltage to the system. The waveform generator 106 responds to an input from the feedback receiver 104 in the primary unit 103 which receives and processes a feedback signal from the feedback transmitter 102 in the secondary unit 105 of the power transformer. A driver (not shown) level shifts the signals into a format suitable for the output power amplifier 108 that energises the primary coil 107. The output power amplifier is itself powered directly from the input power 109.

The secondary unit 105 of the power transfer system 101 comprises a control block 131 coupled to the secondary coil 109 of the power transformer which serves to convert energy induced in the secondary coil 109 to a dc voltage and to transmit signals to the feedback transmitter 102. The secondary coil 109 of the power transformer is wound with a number of turns to suit the output voltage of the system to its external load (not shown). The feedback transmitter 102 transmits a signal to the feedback receiver 104 when certain operating conditions are met. The control block 131 also contains an output switch (not shown) which serves to isolate the load when the level of the voltage converted from energy induced in the secondary coil 109 is below a predetermined value, and then, to apply power to the load when the voltage exceeds this value.

Figure 2:
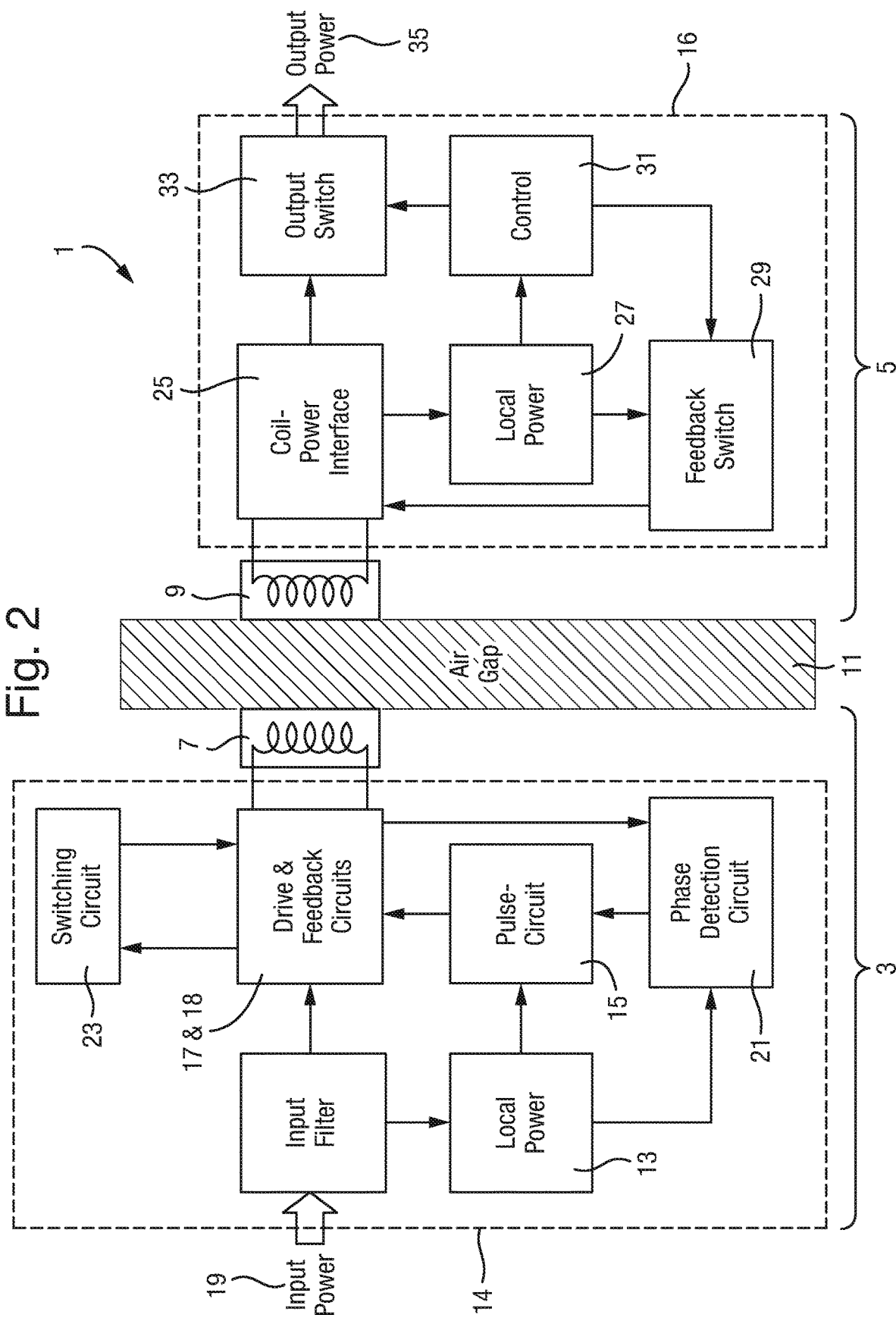
FIG. 2 is a block diagram of an inductive power transfer system according to the example embodiment.

Turning now to an example embodiment of the present invention: the inductive power transfer system 1 of the example embodiment (FIG. 2) is a power transformer comprising a primary unit 3 with a primary power-emitting coil 7 and a secondary unit 5 with a secondary power-receiving coil 9, the coils positioned either side of an air gap 11. The primary coil 7 has associated primary components 14 and the secondary coil 9 has associated secondary components 16, and the system 1 is configured to provide feedback from the secondary unit 5 to the primary unit 3 on the level of input impedance in the secondary unit 5.

The primary unit 3 is configured to operate in, and to switch between, a high-power 'charging' mode and a low-power 'stand-by' mode. When the primary unit 3 is in high-power mode, power is induced in the secondary coil 9 and when the primary unit 3 is in low-power mode, inductive charging in the coil 9 is temporarily paused.

The primary unit 3 switches between charging and stand-by modes in response to detecting signal changes within the primary unit 3 which are indicative of changes in an operating condition in the secondary unit 5. The system 1 is configured so that after initial power-up, the primary unit is in charging (high power) mode, delivering power to the secondary unit.

The primary components 14 include an input filter and local power source 13 coupled to primary circuitry. The primary circuitry includes a phase detection circuit 21, a pulse-generation circuit 15, a drive circuit 17, a primary coil feedback circuit 18 and a switching circuit 23.

The power input 19 to the primary unit 3 is alternating current or direct current power. The input 19 is converted via local power supply 13 to provide an output suitable for supplying the primary components 14. The drive circuit 17 energises the primary coil 7 for transmitting power by induction to the secondary unit 5. The drive circuit 17 receives an ON/OFF signal from the pulse-generating circuit 15. When the signal is OFF, the drive circuit 17 provides high-power charging but when the signal is ON, high-power charging is ceased. The pulse-generating circuit 15 receives an output from the phase detection circuit 21, which is configured to compare the phase of a resonant signal output to a reference value determined by an internal clock. The resonant signal output by the drive circuit 17 passes via the primary coil feedback circuit 18 to the phase-detection circuit 21. The measured difference in phase varies in dependence on the input impedance in the secondary unit 5. Thus the charging mode of the primary unit 3 is altered in response to receiving feedback indicative of changes in an operating condition within the secondary unit 5—the operating condition represented as change in input impedance.

The drive circuit 17 of the primary unit 3, also outputs a resonant signal (via the primary coil feedback circuit 18) to the switching circuit 23. The primary switching frequency circuit 23 is configured to alter the switching frequency of the internal clock to account for low-level changes in background operating conditions, for example, variations in component tolerances, air gap and secondary load. The system 1 is thus compensated for such background variations.

The secondary components 16 include a coil-power interface circuit 25, local power supply 27, feedback switch 29, control circuit 31 and output switch 33.

The coil-power interface circuit 25 includes a storage capacitor (described further below) coupled to the secondary coil 9. The control circuit 31, via the local power supply (which ensures the coil 9 output is suitable for powering the secondary components 16), monitors the induced voltage level on the storage capacitor. When the induced voltage exceeds a first predetermined threshold voltage, the control circuit 31 operates the output switch 33 to allow power output to a load (not shown). This arrangement allows isolation of the load when the power transferred to the secondary unit 5 is insufficient to power the load.

The control circuit 31 also monitors the voltage applied to the load. When the output voltage exceeds a second predetermined threshold voltage, the control circuit 31 operates the feedback switch 29 which switches the input impedance from 'low' to 'high' impedance.

The primary unit 3 detects, in response to the shift in secondary input impedance, a shift in resonant signal phase in its drive circuit 17. The primary unit 3 then switches from high (charging) to low-power (stand-by) mode since further charging is not required.

The output voltage to the load falls when charging is ceased. When the output voltage falls below a third predetermined threshold value, the secondary control circuit 31 and feedback switch 29 adjust the input impedance back to low impedance, forcing the primary unit 3 back into high-power charging mode.

Thus as the secondary unit is charged, output voltage is controlled to be within certain optimal limits.

Detailed Operation

Figure 3:
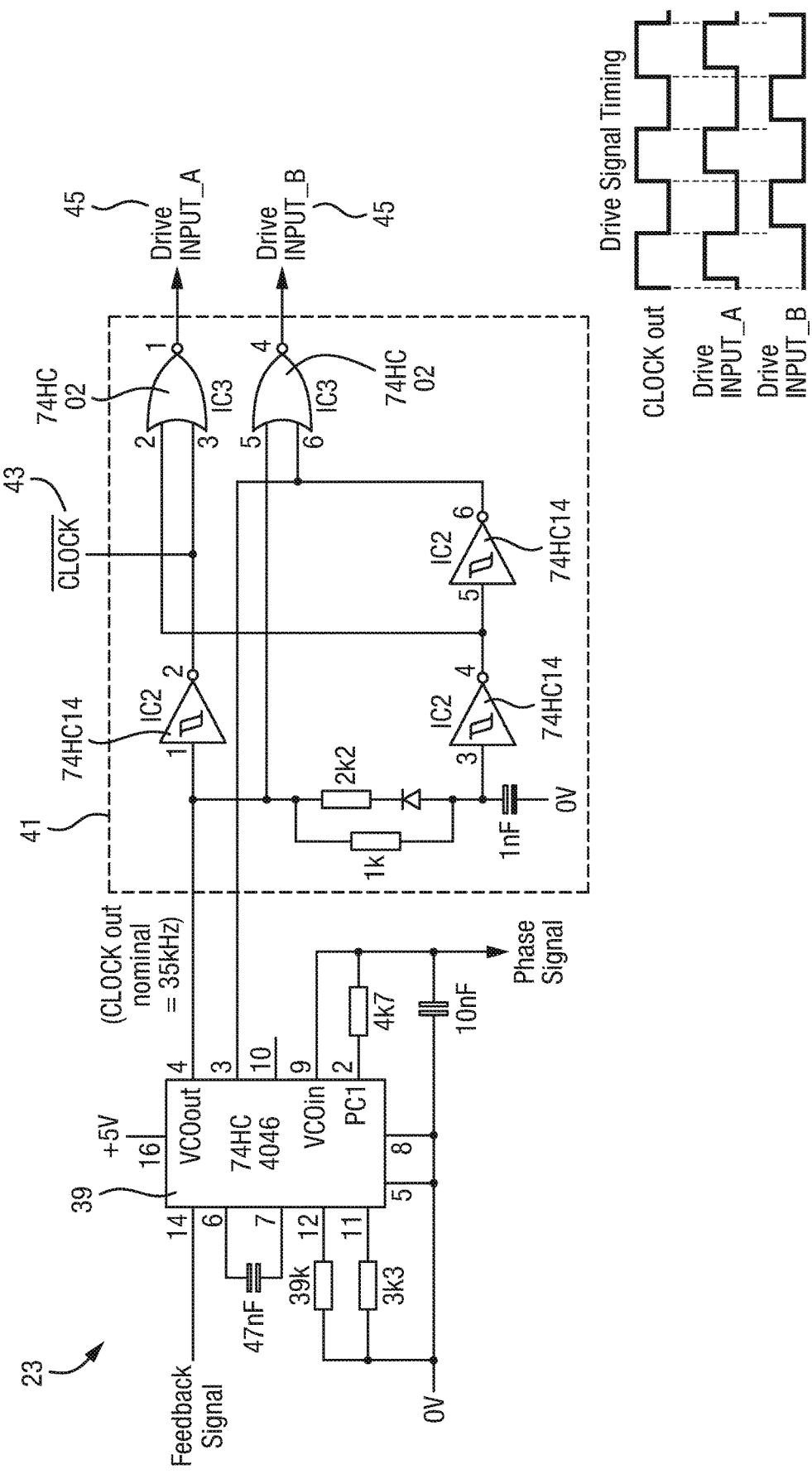
FIG. 3 is a circuit diagram of the primary switching frequency circuit in the example embodiment.

In the example embodiment the basic switching frequency signal is provided by the primary switching frequency circuit 23 (FIG. 3). The basic switching frequency signal determines the system clock signal and the pattern by which energy is applied to the primary coil 7 in high-power (charging) mode (the 'drive signals'). The low-power waveform is provided by separate circuitry (described below).

The primary switching frequency circuit 23 includes a 74HC4046 Phase Locked Loop (PLL) integrated circuit 39 which provides a default frequency of approximately 35 kHz. The circuit 23, through an arrangement 41 of Schmitt triggers (converting the analogue input signal to a digital output signal) and logical "OR" gates, produces three rectangular waveforms. The first is a clock output 43 which determines the drive signal timing, and the second and third are switching drive signals 45 (Drive INPUT_A and Drive INPUT_B) for powering the primary coil 7. The switching drive signals originate from the same waveform, but have opposite polarity (avoiding transformer saturation) and are phase shifted by half a cycle. The combined drive signal, instead of providing continuous maximum power, has approximately 900 ns of dead band every half-cycle to accommodate the physical constraints of the system 1. The relative timing of the two drive signals 45, with respect to the basic clock frequency 43, is such that the deadband period coincides with the start of each clock switching cycle. The drive signals 45 generated in the primary switching frequency circuit 23 feed into the primary drive circuit 17 (described further below).

The waveforms generated by the primary switching frequency circuit 23 are adjusted in response to changes in a received feedback signal from the primary drive circuit 17.

The 74HC4046 PLL integrated circuit 39 compares the received feedback signal phase (at pin 14, see FIG. 9) to the source signal phase (at pin 4) and produces a dc voltage proportional to the phase difference (at pin 2). This dc voltage is used by the 74HC4046 PLL integrated circuit 39 to alter the source frequency via the voltage controlled oscillator input (VCOin on pin 9). The clock cycle frequency is thus adjusted and the timing of the drive signals is correspondingly adjusted, to account for the feedback.

Figure 4:
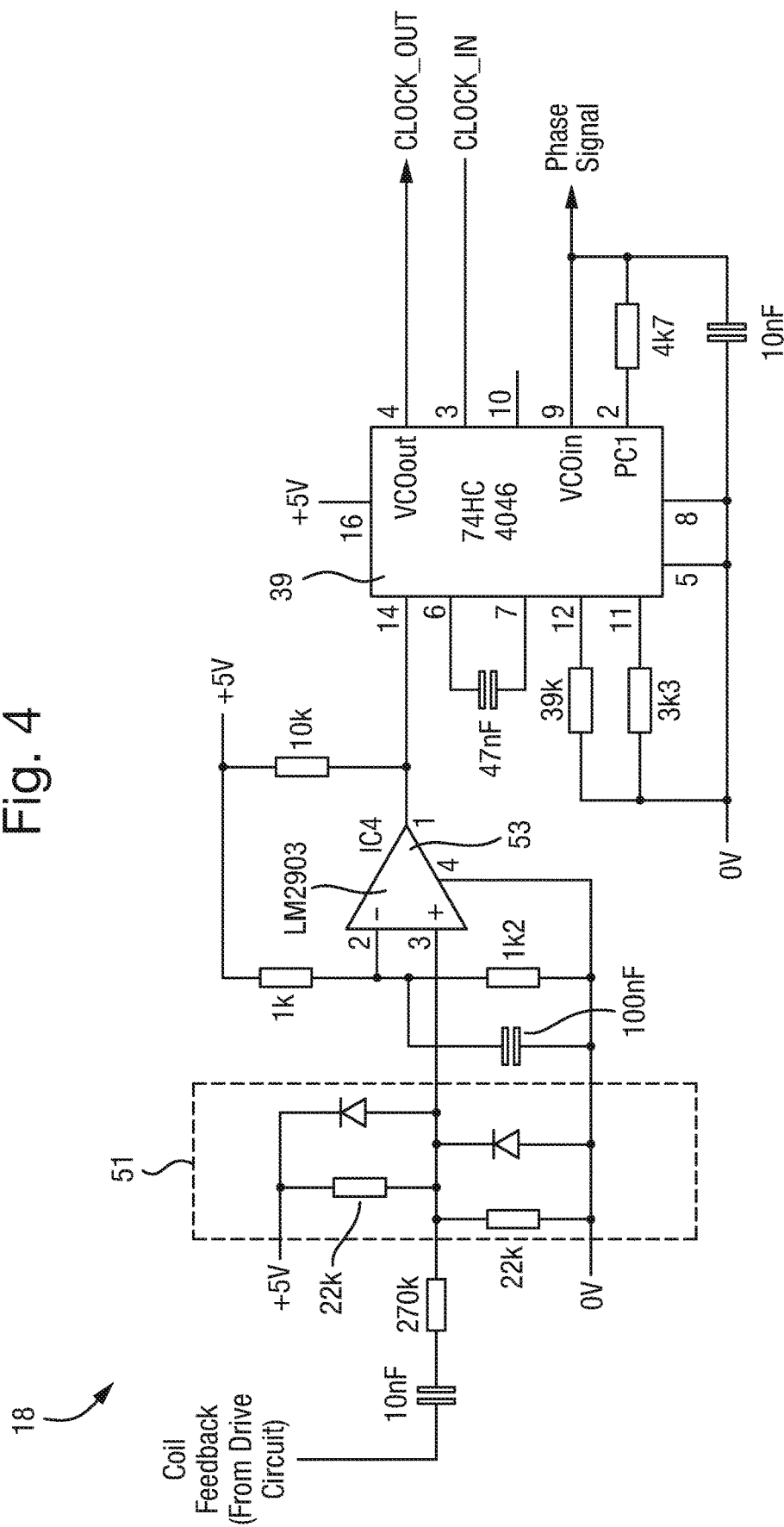
FIG. 4 is a circuit diagram of the primary coil feedback circuit in the example embodiment.

The feedback signal is output from the primary coil feedback circuit 18 (FIG. 4) which is connected to the resonant circuitry within the drive circuit 17 of the primary unit 3.

The input to the primary coil feedback circuit 18 from the resonant circuitry of the drive circuit 17 passes through a potential divider, level shifter and voltage limiter 51, which converts the high voltage alternating current coil feedback signal to a low voltage, 0V to 5V maximum, alternating current signal centred around half the +5V direct current voltage supply of the voltage comparator 53. The voltage comparator 53 then outputs a 0V to 5V rectangular wave in phase with the original coil feedback signal at its input.

Figure 9:
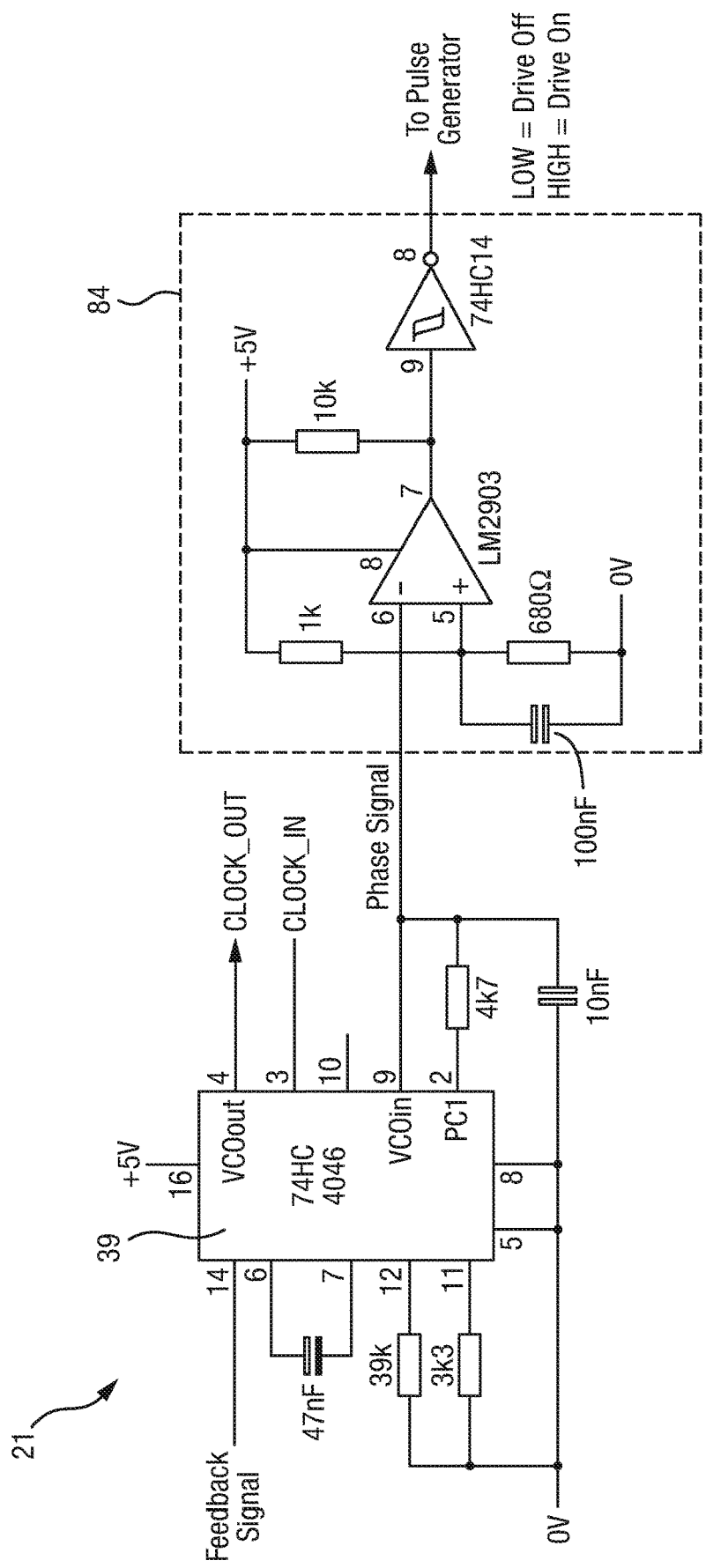
FIG. 9 is a circuit diagram of the primary phase detection circuit in the example embodiment.
Figure 10:
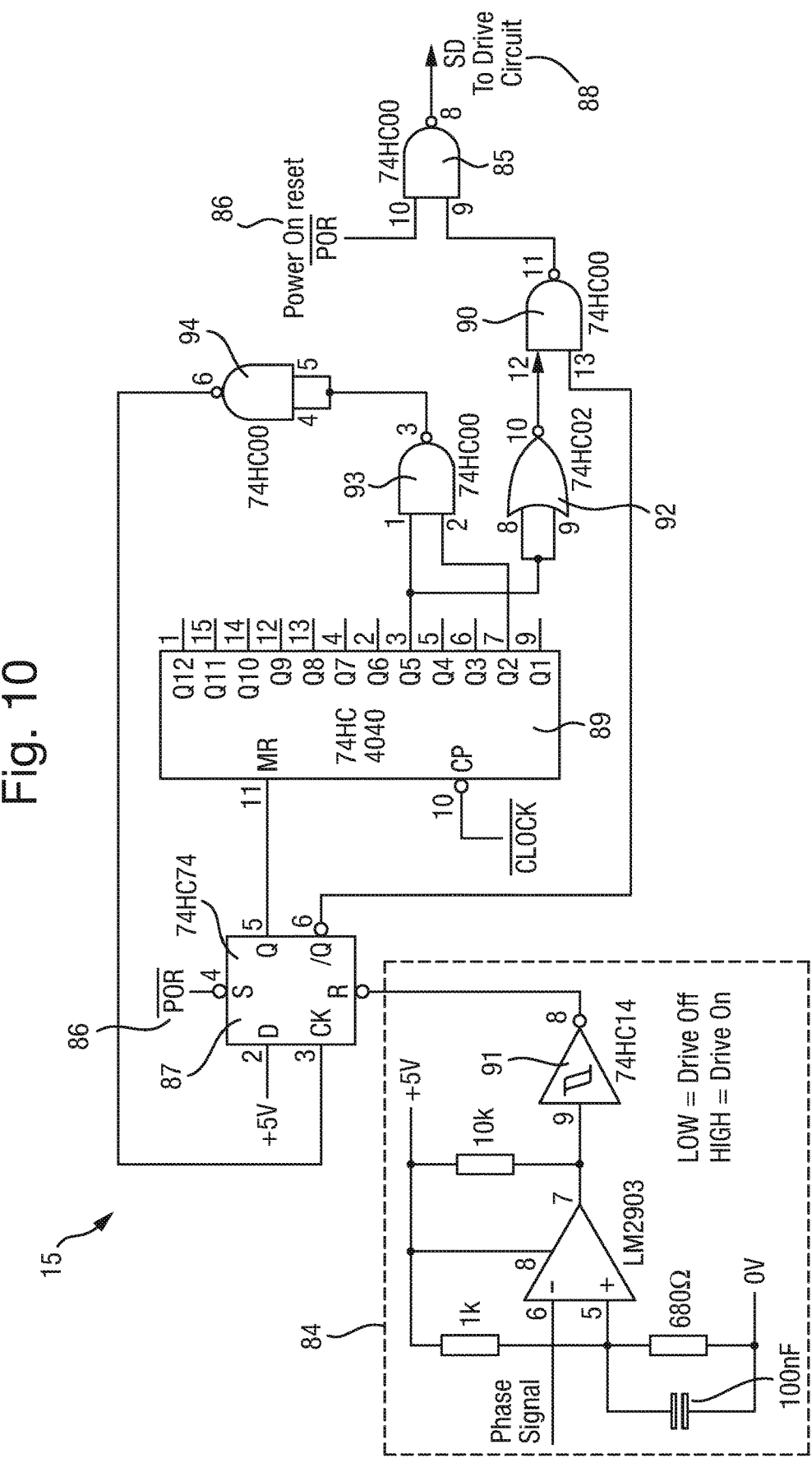
FIG. 10 is a circuit diagram of the primary pulse generator circuit in the example embodiment.

The comparator 53 outputs to pin 14 of the 74HC4046 PLL integrated circuit 39 (also shown in FIGS. 3 and 9). Then, the clock output is adjusted via the primary switching frequency circuit 23 (FIG. 3) using the feedback signal output from the voltage comparator 53, as described above. Separately, the power mode of the drive waveforms 45 is adjusted via the phase-detection circuit 21 (FIG. 9) and pulse-generating circuit 15 (FIG. 10) as described below.

So, as the resonant frequency of the primary unit circuitry changes, both the switching frequency and the power mode of the drive waveforms is adjusted.

Figure 5:
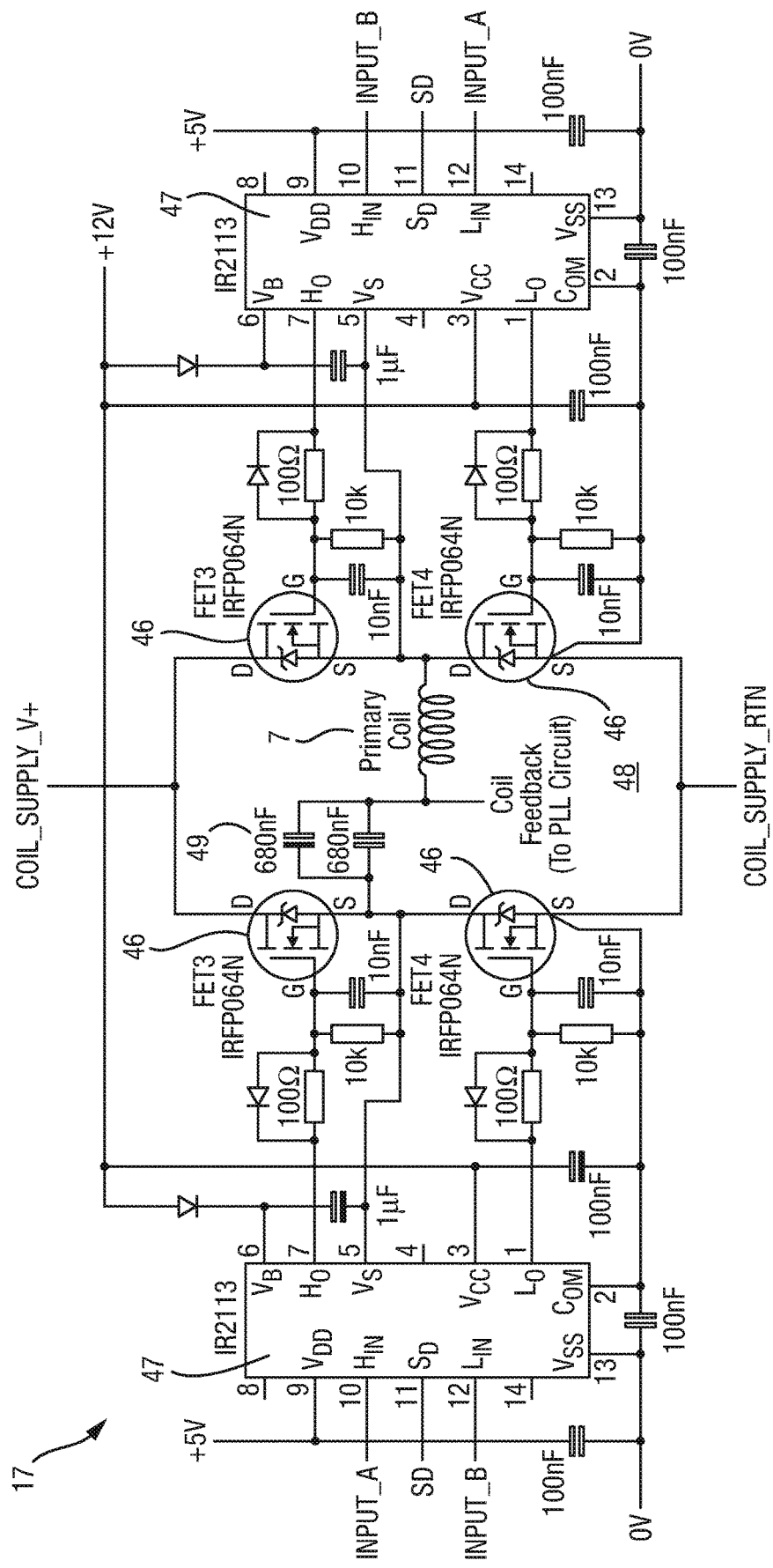
FIG. 5 is a circuit diagram of the primary drive circuit in the example embodiment.

The INPUT_A and INPUT_B drive signals from the primary switching frequency circuit 23 input to the drive circuit 17 (FIG. 5). The signals pass to two driver integrated circuits 47 (high and low side IR2113 drivers). The driver integrated circuits 47 feed four high and low side MOSFET transistors 46 (FET1 to FET4) which provide drive signals to power the primary coil 7.

The primary coil 7 is coupled in series to a capacitor pair 49 forming a resonant circuit. A pick-off 48 from the coil-capacitor resonant circuitry on the drive circuit 17 outputs to the primary coil feedback circuit 18, which as described above, provides a feedback signal to the primary switching frequency circuit 23 and as described below, provides a feedback signal to the primary phase-detection circuit 21.

Figure 6:
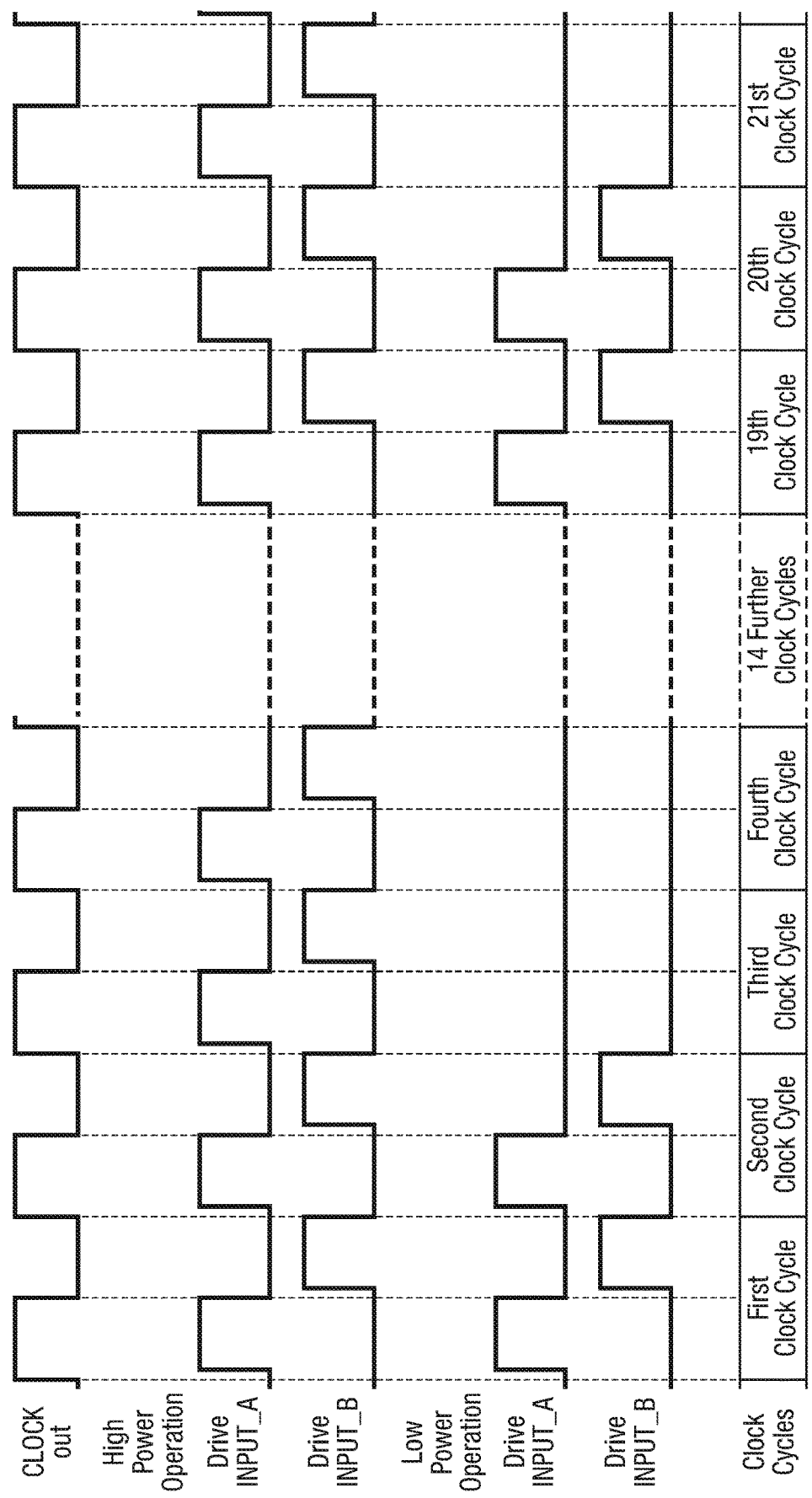
FIG. 6 is a timing diagram showing transformer high and low-power drive waveforms in the example embodiment.

The drive circuit 17 generates a drive waveform (FIG. 6) to energise the primary coil 7. The high-power drive waveform in the present embodiment is similar to the high-power waveform of the example prior art system. That is, there is a rectangular drive waveform, which alternates in polarity every half-cycle, with a short deadband period at the start of every half-cycle. The resultant drive is formed from an in-phase and an anti-phase drive signal. The switching frequency of the waveform is similar to that of the example prior art system. [See HIGH POWER OPERATION signals Drive INPUT_A and Drive INPUT_B in FIG. 6].

However, in low-power mode, the drive waveform differs in profile to the example prior art (whilst having a similar switching frequency). The prior art system provides a short power burst, which alternates in polarity, every half-cycle. The low-power drive signal of the example prior art is a rectangular waveform with, simply, a reduced mark-space ratio compared to the high-power waveform. The example embodiment instead has a double pulse at maximum power over two clock cycles followed by a period of nil power for 16 clock cycles. The double pulse repeats every 18 clock cycles. [See LOW POWER OPERATION signals Drive INPUT_A and Drive INPUT_B in FIG. 6]. In the example embodiment, a period of 18 cycles is selected so that after the double pulse there is an "off period" long enough for the secondary output to have dropped a little, but short enough so that it does not drop too much before it is sampled again. 16 cycles of "off period" also provides a good "binary" figure (i.e. $2^4$) for the counter to count. The use of nil power in the "off period" rather than switching to a low mark-space ratio as in the example prior-art, simplifies the control circuitry. It also prevents high frequency ringing in the capacitor-inductor resonant pair, which, in the systems of the example prior-art, tends to generate unwanted electrical noise during the low-power periods. It will be appreciated that in an alternative embodiment, the period of 18 cycles may instead be a period of 16 cycles, or some other number of cycles.

So, whilst in high-power mode power is applied to the primary coil 7 during every switching cycle, in low-power mode, power is applied during only two switching cycles in every 18, followed by a power-off period of 16 cycles. Such an arrangement advantageously increases efficiency of the system, whilst enabling 'sampling' of the primary resonant signal.

Figure 7:
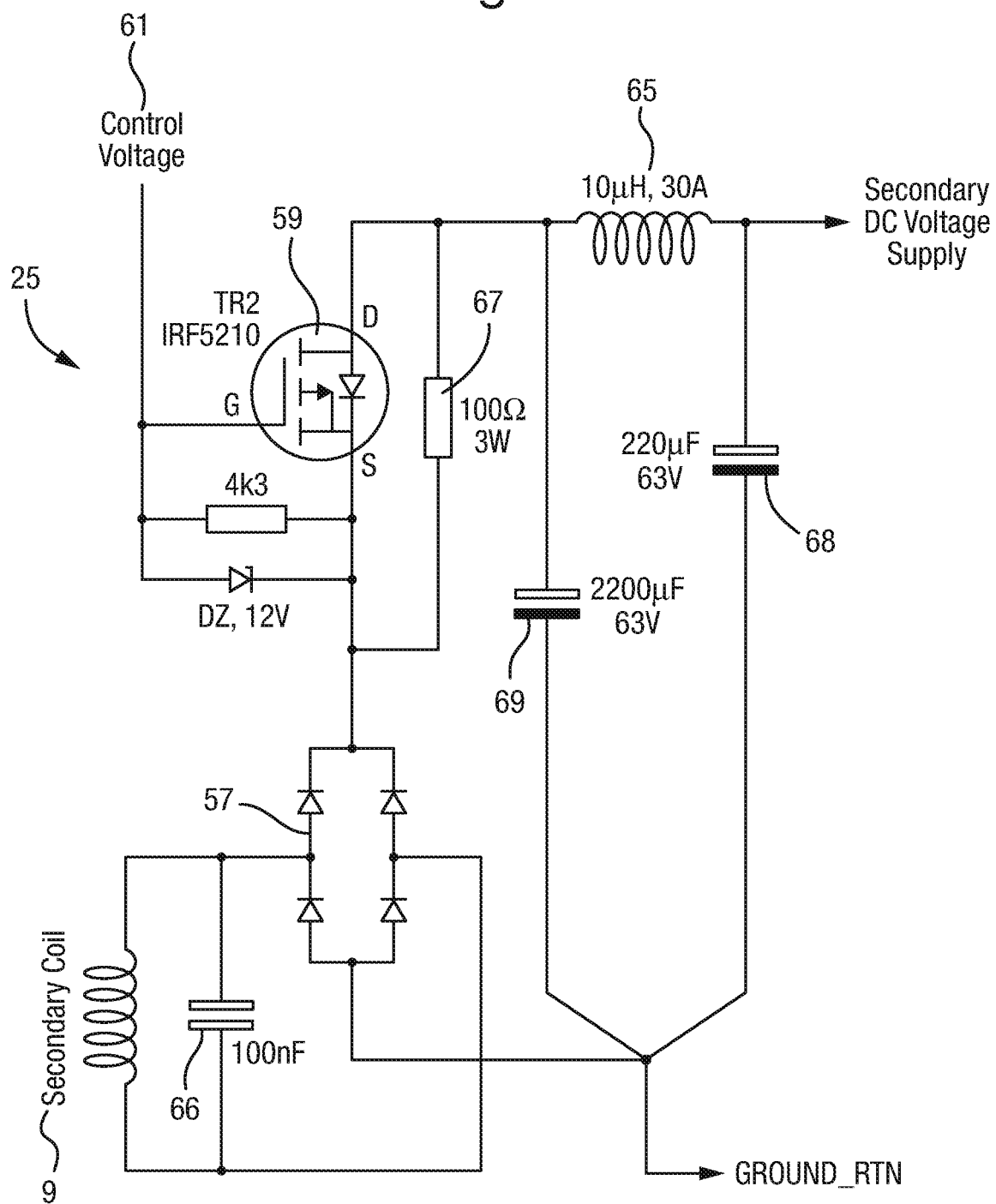
FIG. 7 is a circuit diagram of the secondary coil-power interface circuit in the example embodiment.

On the secondary side, power is induced in the secondary coil 9 in the secondary coil-power interface circuit 25 (FIG. 7). A tuning capacitor 66 is connected in parallel with the secondary coil 9 and is arranged to resonate at a predetermined frequency when the width of the air gap 11 separating the transformer cores of the primary 7 and secondary 9 coils is at the maximum value that will allow operation of the power transfer system 1. The arrangement results in the energy coupling coefficient remaining stable over variations in the air gap distance 11.

The induced alternating current signal is converted to direct current by a bridge rectifier 57 in series with the coil 9. The direct current voltage is applied to a large value storage capacitor 69.

A control voltage is supplied to the coil-power interface circuit 25 via an impedance switch 59 in the form of a transistor. When the impedance switch 59 is closed, there is a low-impedance path through the switch 59 to the reservoir 2200 μF capacitor, but when the switch 59 is open, the input is re-routed via a 100R resistor 67 which is connected in parallel with the impedance switch 59, providing a high input impedance path to the reservoir 2200 μF capacitor. The parallel resistor 67 is needed so that the input is not left totally open circuit, preventing further primary signals generating very high voltages which might overstress the coil-power interface circuit 25 components.

Figure 8:
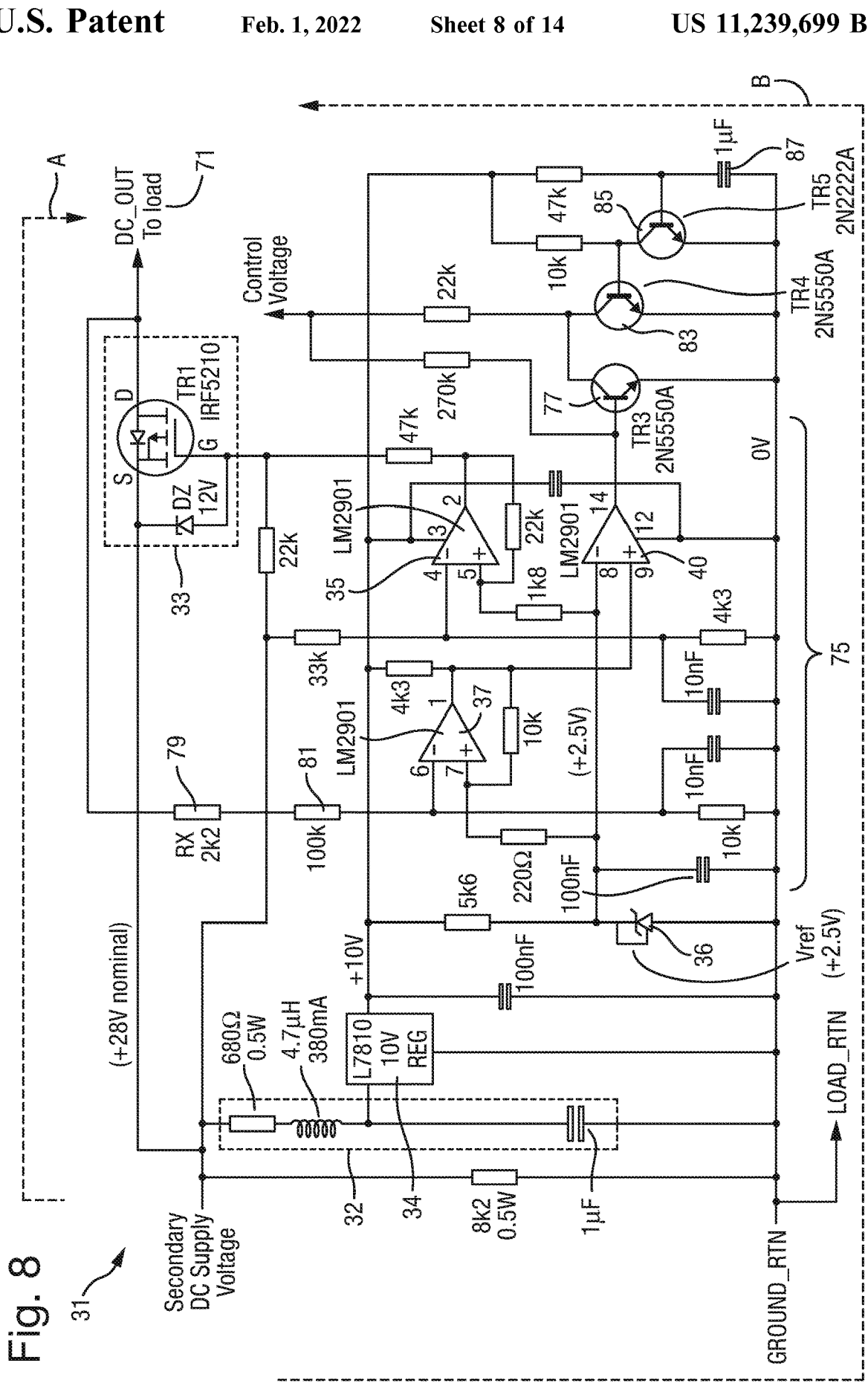
FIG. 8 is a circuit diagram of the secondary control circuit in the example embodiment.

The direct current voltage is further frequency filtered from the reservoir capacitor 69 by a low-pass filter comprising inductor 65 and capacitor 68, and outputs to the secondary control circuit 31 (FIG. 8).

In the secondary control circuit 31, a first pathway, 'A' supplies output power 71 to a load, via the output switch 33. A second pathway, 'B' provides a multi-stage voltage comparator 75, which monitors the output voltage against predetermined voltage thresholds.

The direct current supply voltage is filtered via a low-pass filter circuit 32, and applied to a voltage regulator 34 which maintains its output at +10V. The regulated supply powers the multi-stage comparator circuitry 75. A reference voltage is provided at +2.5V by a voltage generator 36.

The multi-stage comparator 75 is initially powered by the induced energy in the secondary coil. Switches TR4 83 and TR5 85 act as a power-on-reset circuit placing the secondary unit 5 in the low input impedance state at power-up to ensure fast charging (after a stabilisation period of approximately 8 ms). The 1 μF capacitor 87 on the base of switch TR5 85 maintains the low input impedance state for approximately 6 ms, after which time the secondary control circuit 31 is fully powered and assumes control of the input circuit (i.e. of the control voltage). Thus, the primary unit 3 is initially in charging mode (after the first feedback from the secondary unit 5).

Once the secondary unit 5 has received sufficient power to power the secondary control circuit 31, it operates the output switch 33 to enable powering of the load (not shown). The voltage level on the capacitor 68 is compared to a first threshold voltage by a first voltage comparator 35 in the multi-stage comparator circuit 75.

As well as monitoring the induced voltage, the multi-stage comparator circuit 75 is configured to monitor the output voltage 71 to the load (not shown). The voltage 71 applied to the load is monitored by a second 37 and a third 40 voltage comparator. The second comparator 37 monitors the output voltage 71 against a second threshold voltage and activates a control switch 77 (TR3) which in turn controls the impedance switch 59 (FIG. 7) gate voltage to control the feedback operation. So, when the output voltage 71 is above the second threshold, the secondary unit 5 switches to high impedance, signalling to the primary unit 3 to cease charging. The third comparator 40 monitors the output voltage 71 against a third threshold voltage, as the output voltage 71 falls. Then the same control switch 77 is activated to reinstate charging when the output voltage falls below the minimum level.

The output voltage 71 in the example embodiment is nominally +28V dc (DC_OUT with respect to LOAD_RTN in FIG. 8). This output value depends on the value of resistor RX 79. In FIG. 8 it is shown as 2 k2 which gives a +28V output. Increasing the value of resister RX 79 increases the output voltage 71 and reducing it, and the value of the 100 k resistor 81 in series with it, reduces the output voltage 71.

The effect of the secondary unit 5 switching its input from low to high impedance is to cause a large phase shift in the signal that the primary unit 3 detects from the junction 48 of its coil 7 and capacitor pair 49 series resonant pair. This phase shift is much greater than it sees during normal operation, for example due to temperature or air gap changes.

As described above, the primary coil feedback circuit 18 provides a feedback signal drawn from the primary coil-capacitor resonant circuitry (7, 49) to the phase detection circuit 21 (FIG. 9). In the phase-detection circuit 21, a voltage comparator circuit 84 connected to the 74HC4046 PLL integrated circuit 39 output at pin 9 compares the dc voltage generated by the 74HC4046 (which reflects the phase comparison between the feedback signal and source signal) to a reference voltage. When the voltage falls below the reference voltage, the phase-detection circuit 21 outputs an indication to the pulse-generating circuit 15 that indicates the secondary unit 5 must have switched to the high impedance state. The pulse-generating circuit 15 then, as long as the system is not in power-up state, sends a shut-down signal to the drive circuit 17 (FIG. 5). In response the drive circuit 17 switches off the coil drive waveform by setting the IR2113 high-low side driver's shut-down signal into the active high state.

Once the primary has shut down, the pulse-generating circuit 15 (FIG. 10) generates a double drive pulse after a wait delay of 16 clock cycles. The double pulse is used to 'sample' the phase every 18th cycle (approximately equivalent to every 0.5 ms at 35 kHz source frequency). Thus the primary unit 3 can detect when the secondary unit 5 has switched back into the low impedance state, and subsequently switch back to high-power mode, with a continuous (i.e. every cycle powered) drive signal. A double pulse (FIGS. 3 and 11) is required in order to correctly sample the phase. The first pulse generated after a power off period is often distorted and therefore a single pulse cannot be relied upon to accurately reflect the phase. The system 1 is configured so that at initial power up, high power is provided to the secondary unit 5 after stabilisation of the internal signals. At power on, the power-on reset signal 86 inputs to a first NAND gate 85 to set the output shut-down signal 88 at pin 8 (which feeds the drive circuit 17) into the active high state ("high"). Then, no drive signals are generated by the drive circuit 17 until all internal supplies and signals in the system 1 are stable and valid.

The power-on reset signal 86 also inputs to a latch circuit 87 (in this embodiment a D-type flip-flop 74HC74 circuit with clock, data and reset inputs), which sends the output at pin 5 of the latch circuit 87 into the "high" state. The pin 5 output of the latch circuit 87 connects with a counter circuit 89 (in this embodiment a 12-stage binary ripple counter with a clock input, overriding asynchronous master reset input and twelve parallel outputs). The latch circuit 87 provides the master reset input to the counter circuit 89 to hold the counter circuit 89 in a "reset" state. The inverted output of the latch circuit 87 at pin 6 is in the "low" state, which forces the output of a second NAND gate 90 (at pin 11) into the "high" state. Then, since both the input at pin 10 and the inverted input at pin 9 of the first NAND circuit 85 are "high", this sets the shutdown signal output at pin 8 "low". The drive circuit 17 then runs at full power. So, after a stabilisation period of around 8 ms after power up, high power is provided to the secondary unit. Then, as described above, the power-on-reset circuit maintains low input impedance to ensure fast charging for a short period of around 6 ms, after which time, the secondary control circuit 31 assumes control of the input circuit.

At some later time, when the secondary input switches to its high impedance state (indicating that enough power has been delivered), the phase detect circuit 84 causes a "low" signal to the latch integrated circuit 87. The latch integrated circuit 87 then resets, which causes (i) the output at pin 5 to be "low", removing the forced reset from the counter integrated circuit 89, and (ii) the inverted output at pin 6 to be "high". Since the counter integrated circuit 89 output at pin 3 is still "low", the inverted signal output from NOR gate 92, at pin 10, is still "high". Then, since both inputs (pins 12 and 13) to the second NAND gate 90 are "high" the output at pin 11 is "low" and this forces the shutdown signal output from the first NAND gate 85 (at pin 8) to be "high" (i.e. in the active high state). The drive circuitry will therefore be shut down and no further power will be transferred into the secondary unit.

The counter circuit 89, now released from reset, counts up until its output at pin 3 goes "high", after 16 cycles. Then the NOR gate 92 output at pin 10 switches "low", which forces the second NAND gate output at pin 11 "high" again. The two "high" inputs to the first NAND gate 85 (pins 9 and 10) cause the shutdown signal (at pin 8) to be "low", and the drive circuit is switched back on again. After two further cycles the counter circuit 89 output at pin 7 switches to "high" which forces the output of a third NAND gate 93 (at pin 3) to be "low", which is inverted at a fourth NAND gate 94 (pin 6) to place the input clock signal to the latch circuit 87 in "high" state. This causes the latch circuit 87 output at pin 5 to be set "high" again and the inverted output at pin 6 "low" again. The counter circuit 89 is then reset once more.

If during the two pulse burst the phase detect circuit 84 detects that the phase is such as to indicate that the secondary input impedance is low again, then the phase detect circuit 84 outputs a "high" signal to the latch circuit 87. Then, the latch remains in the same state (i.e. the counter circuit 89 is held in "reset" and the shutdown signal will remain off). However, if the phase detect circuit 84 instead detects that the phase is such as to indicate that the secondary input impedance is still high, then the input to the latch circuit 87 (at pin 1) goes "low" again and the latch is reset once more. The above-described cycle of 16 "drive off" clock cycles followed by two "drive on" clock cycles continues.

Figure 11:
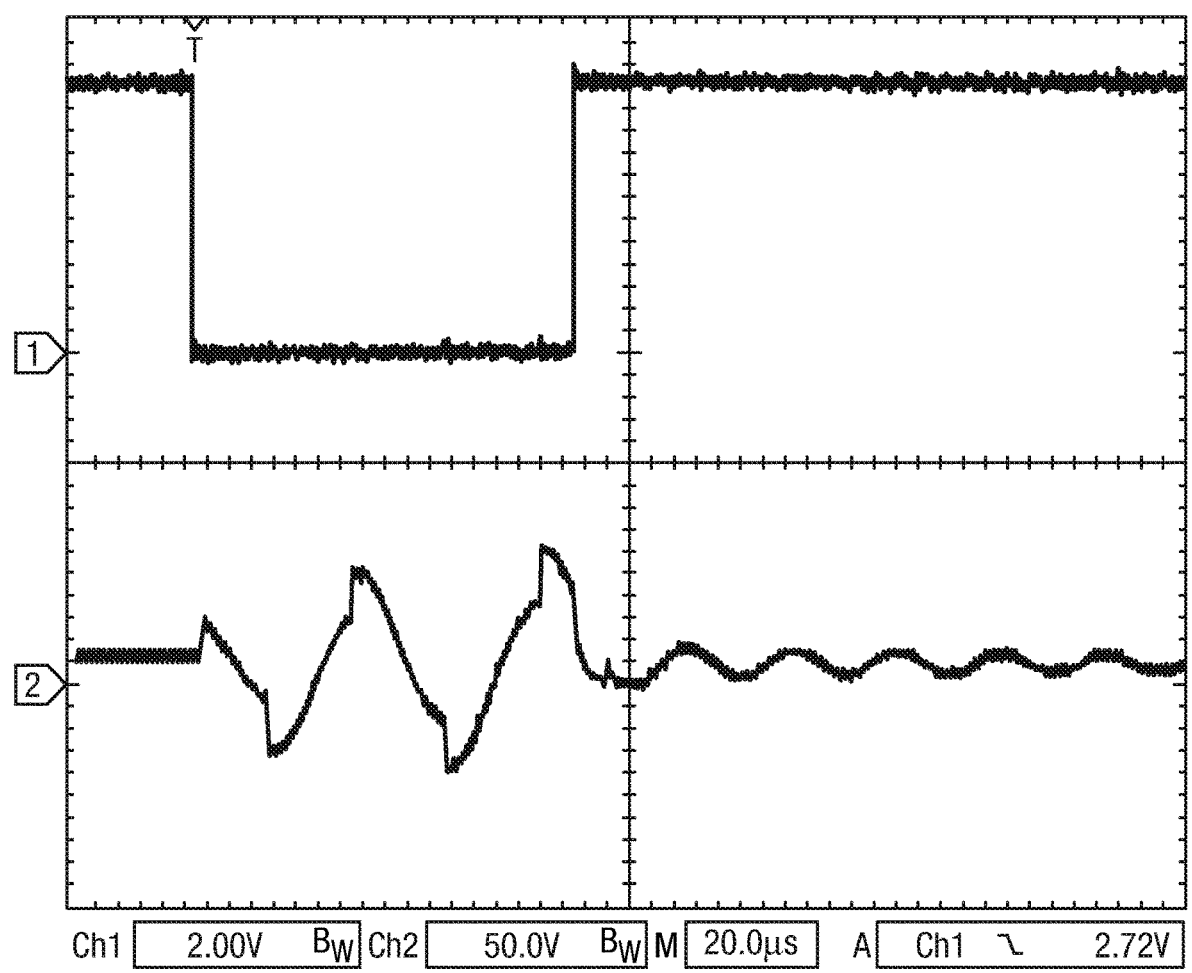
FIG. 11 is an oscilloscope graph of the voltage applied to the primary coil in the low-power state in the example embodiment.

FIG. 11 shows low-power sampling in which the system is maintained in low-power mode. Whilst the primary drive signal is pulsing, the shut-down signal is temporarily out of the active high state. The phase of the primary drive signal at the coil-capacitor junction is detected as indicating that the secondary input is still high impedance, thus the shut-down signal returns to the active high state and the transformer remains in low-power mode.

Figure 12:
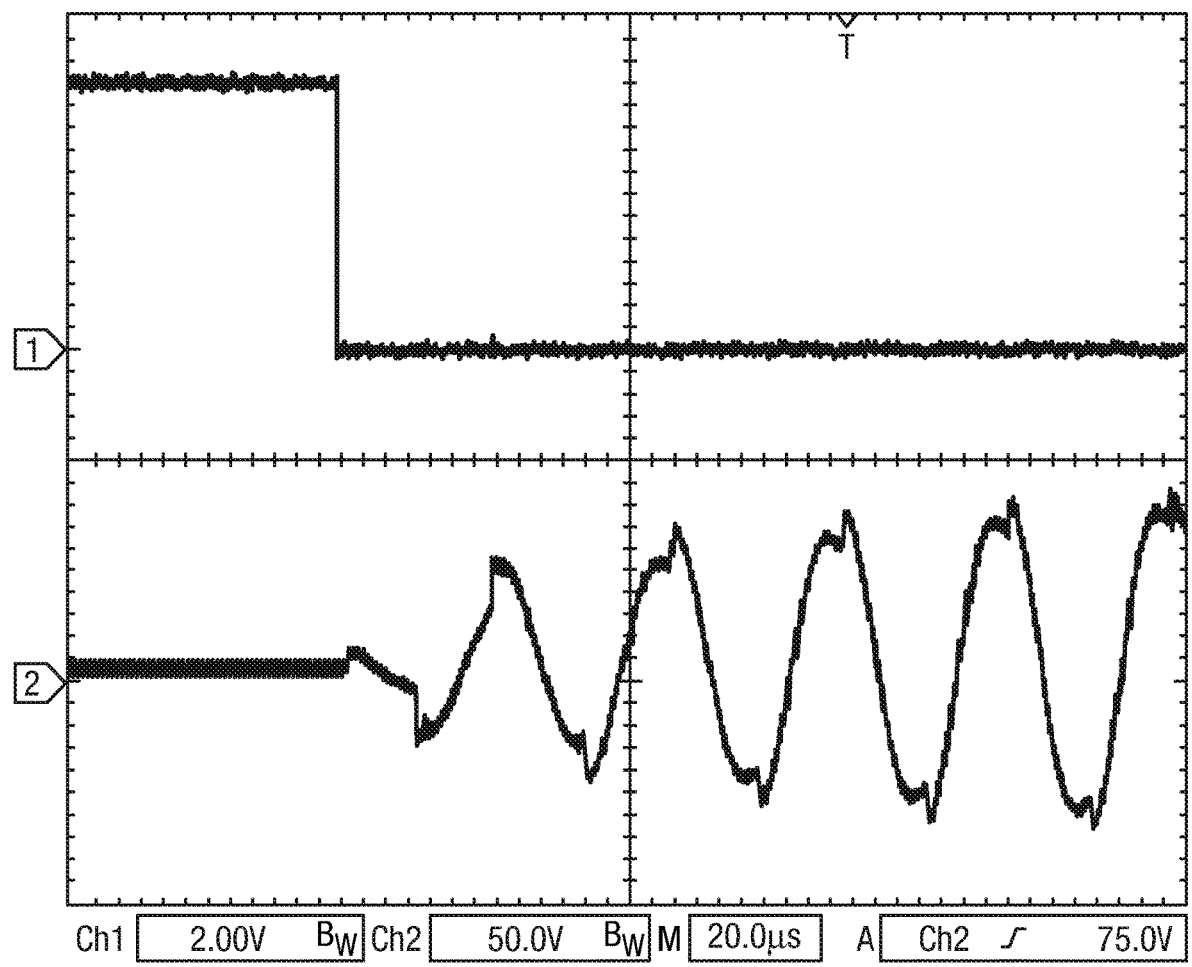
FIG. 12 is an oscilloscope graph of the voltage applied to the primary coil during the primary low-to-high-power transition in the example embodiment.

FIG. 12 shows low-power sampling in which the system 1 is switched to high-power mode. The secondary unit 5 has (as a result of the output voltage 71 falling to the minimum operational level (the third threshold)) switched back to low input impedance (i.e. requiring energy). The first pulse of the double sampling pulse is distorted and ignored, but by the second pulse, the phase is correctly detected as indicating that the secondary load has been switched back in. As a result, the shut-down signal remains low and the drive output switches to high-power operating mode (i.e. the signal is maintained after the double pulse).

Figure 13:
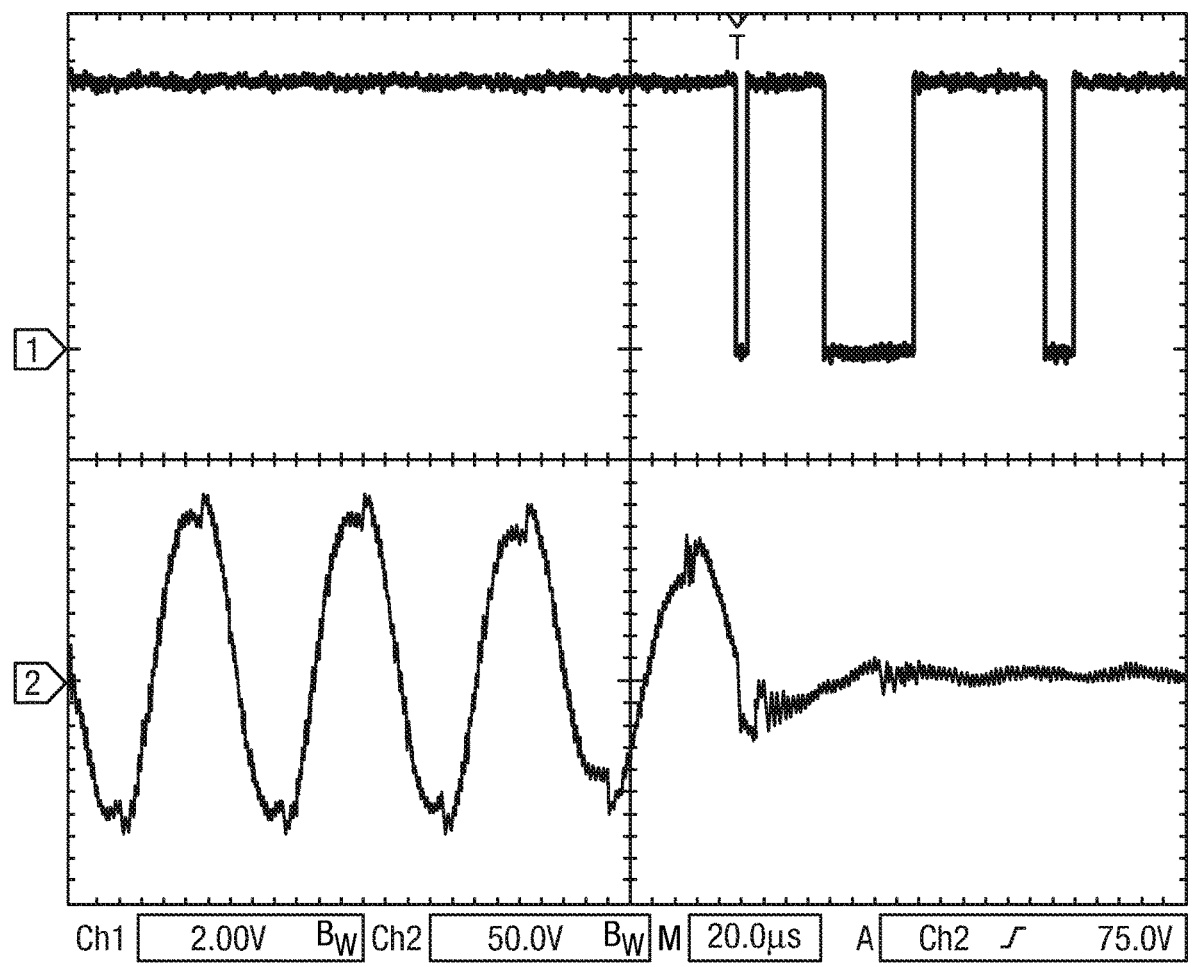
FIG. 13 is an oscilloscope graph of the voltage applied to the primary coil during the primary high-to-low-power transition in the example embodiment.

FIG. 13 shows the transition from high to low-power mode. When the primary unit 3 is in the high-power mode (i.e. the secondary input has low impedance indicating that it requires energy) and the secondary output voltage 71 reaches the second threshold, then the secondary unit 5 switches its input to high impedance. The effect on the primary drive signal at the coil-capacitor junction 48 is a shift in phase, and a drop in the primary drive output, due to the circuit no longer being at the correct resonant frequency. The shift in phase causes the primary low-power pulse generator circuit 15 (FIG. 10) to emit the shut-down signal, and the transformer switches into low-power mode.

Figure 14:
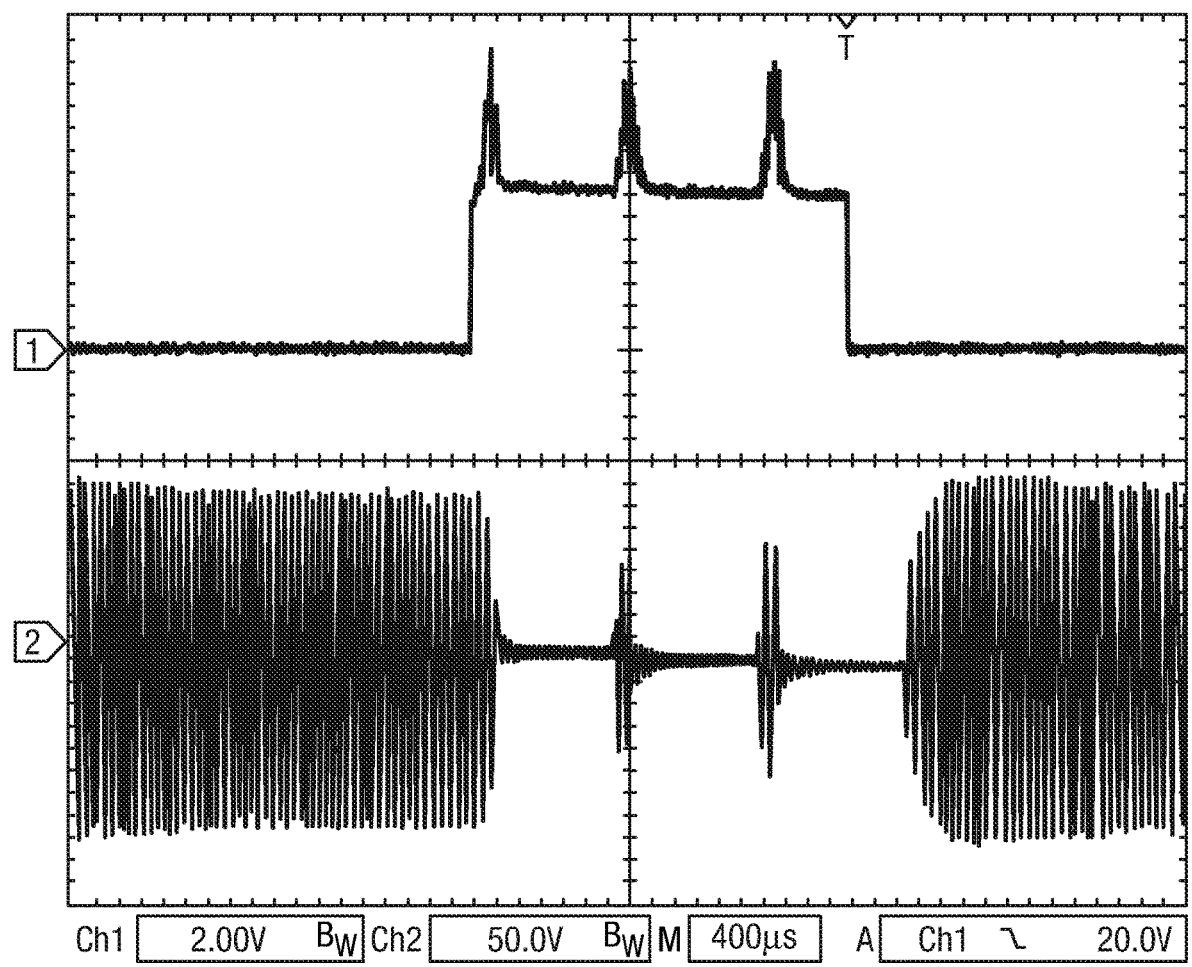
FIG. 14 is an oscilloscope graph of the voltage applied to the primary coil during the primary high-to-low and low-to-high-power transitions in the example embodiment.

FIG. 14 shows a complete low-power period. The secondary input MOSFET gate drive is 'off' (so that it merely follows the voltage present on the source pin—see FIG. 7). When it detects that its output voltage has fallen to the minimum operational level (by comparison of the output voltage against the third threshold voltage) it sends the gate drive signal to make switch 59 low again, to provide a low-input impedance. This is detected by the primary unit 3 next time it pulses its output and high-power mode operation begins again.

The secondary control circuit 31 in the secondary unit 5 is arranged to present a positive feedback condition to the primary unit 3 at initial power up. This is achieved by ensuring that the secondary unit 5 input impedance powers up in the "low" impedance state. Hence, when the secondary unit coil 9 is positioned close to the primary unit 3, the primary unit 3 will detect the feedback indicator and switch into high-power mode.

Thus, as has been described, in the example embodiment the transformer system 1 self-regulates without requiring additional components, to control the voltage 71 applied to the load. A substantially constant voltage can be delivered to the load despite variations in the input supply to the primary unit 3, variations in the air gap between the primary 3 and secondary 5 units and variations in the current demanded by the load.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, in an air-carry embodiment the power source to the primary unit can range from 28V dc, to 200V 3-phase at 400 Hz, which when full wave rectified provides nominally 270 Vdc, or for newer and future aircraft types a direct supply of 270V dc prime power. The primary unit power switching output circuit can be adjusted to operate of any dc supply in the range 28V to 270V by selection of the appropriate primary coil inductance value, and then the appropriate value of capacitor to maintain the correct resonant frequency.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An inductive power transfer system for coupling a power source to a load across an air gap, the system comprising a primary unit associated with a host platform and a secondary unit arranged to receive power transmitted inductively from the primary unit,
    wherein the primary unit includes:
        a phase detection circuit configured to detect phase changes in a signal in the primary unit indicative of changes in an operating condition within the secondary unit;
        a drive; circuit
        configured to adjust the power level transmitted to the secondary unit depending on the detected phase,
        wherein the drive circuit comprises a primary inductor coil and a series resonant capacitor forming a resonant circuitry; and
        a primary switching frequency circuit comprising an internal clock and configured to alter a switching frequency of the internal clock; and
    wherein the phase changes detected by the phase detection circuit are phase changes in a resonant signal of the resonant circuitry relative to a clock signal phase; and
    wherein the phase detection circuit is configured to measure the resonant signal phase by detecting the phase of a voltage waveform on the junction of the series resonant capacitor and primary inductor coil.

2. A system according to claim 1 wherein the secondary unit includes control circuitry and the operating condition is a change in input impedance of the secondary unit.

3. A system according to claim 1 wherein the drive circuit is operable in each of a charging mode and a stand-by mode, and the drive circuit is configured to switch between the charging mode and the stand-by mode in response to the detection by the phase detection circuit of the phase changes.

4. A system according to claim 3 wherein the phase detection circuit is configured to provide an ON/OFF shut-down signal to the drive circuit, and the drive circuit is configured to operate in charging mode when the shut-down signal is OFF and stand-by mode when the shut-down signal is ON.

5. A system according to claim 1 wherein the phase detection circuit is configured to detect the phase changes by measuring the difference between the resonant signal phase and the clock signal phase.

6. A system according to claim 5 wherein the phase detection circuit is configured to generate a direct current voltage proportional to the difference.

7. A system according to claim 6 wherein the phase detection circuit is arranged to compare the direct current voltage to a reference voltage, and to send the shut-down signal to the drive circuit when the direct current voltage falls below the reference voltage.

8. A system according to claim 1 wherein the secondary unit includes control circuitry and the operating condition is a change in input impedance of the secondary unit and the phase detection circuit is configured such that the resonant signal phase changes in response to the varying of the input impedance.

9. A system according to claim 2 wherein the secondary unit is operable to apply an output voltage to the load, which output voltage is proportional to the induced power, and the secondary unit comprises a control circuit configured to detect when the output voltage exceeds a predetermined value and, in response, to vary the input impedance.

10. A system according to claim 9 wherein the secondary unit is configured such that when the output voltage exceeds the predetermined value, the control circuit varies the input impedance.

\* \* \* \* \*

UNITED STATES PATENT AND TRADEMARK OFFICE
CERTIFICATE OF CORRECTION

| | | |
|---|---|---|
| PATENT NO. | : 11,239,699 B2 | |
| APPLICATION NO. | : 16/500899 | |
| DATED | : February 1, 2022 | |
| INVENTOR(S) | : Howard Mallory Leeks | |

It is certified that error appears in the above-identified patent and that said Letters Patent is hereby corrected as shown below:

In the Claims

Column 14, Claim 1, Lines 23-25 should read:
a drive circuit configured to adjust the power level transmitted to the secondary unit depending on the detected phase, Signed and Sealed this
Twelfth Day of July, 2022

*Katherine Kelly Vidal*

Katherine Kelly Vidal
*Director of the United States Patent and Trademark Office*